Figure 1:
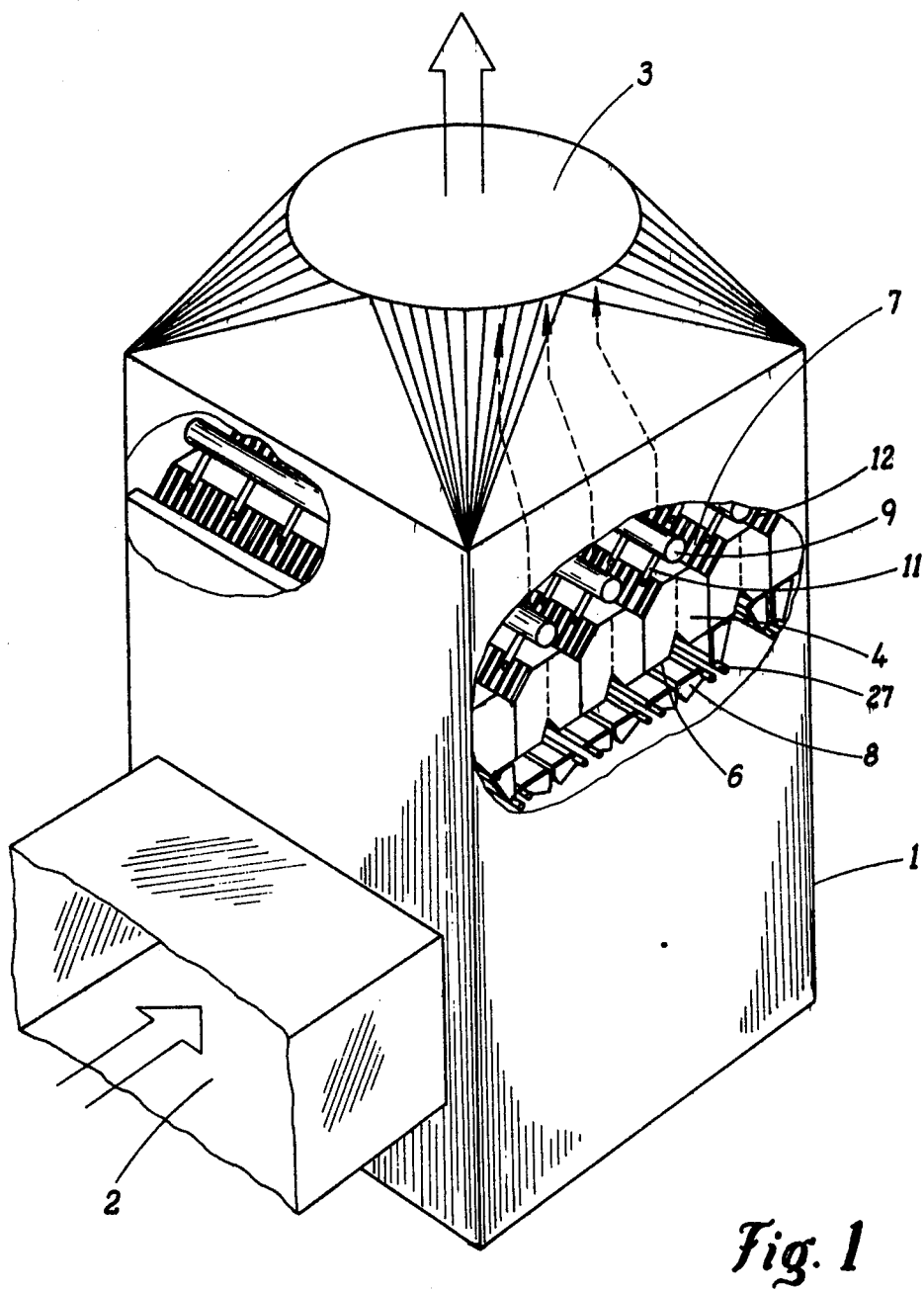

United States Patent [19]

Smith

[11] 4,093,433

[45] June 6, 1978

[54] DAMPER ASSEMBLY FOR MOBILE BED SCRUBBER

[75] Inventor: Mervin L. Smith, Sellersburg, Ind.

[73] Assignee: American Air Filter Company, Inc., Louisville, Ky.

[21] Appl. No.: 492,705

[22] Filed: Jul. 29, 1974

[51] Int. Cl.² ............................................ B01D 47/12
[52] U.S. Cl. ........................................ 55/226; 55/233; 55/344; 55/418; 55/516; 261/23 R; 261/64 R; 261/96
[58] Field of Search .................. 55/90, 91, 98, 226, 55/233, 344, 418, 420, 483, 484, 494, 512, 516; 261/23 R, 64 R, 96, 97; 251/300, 301

[56] References Cited

U.S. PATENT DOCUMENTS

| 1,224,136 | 5/1917 | Caskey | 251/301 X |
| 1,915,710 | 6/1933 | Wright | 251/300 X |
| 1,961,956 | 6/1934 | Bleibtreu et al. | 55/226 |
| 3,380,475 | 4/1968 | Armstrong | 251/301 X |
| 3,726,065 | 4/1973 | Hausberg et al. | 55/226 X |
| 3,733,061 | 5/1973 | Bockman | 261/23 R X |
| 3,810,348 | 5/1974 | Byers et al. | 55/91 |

Primary Examiner—Bernard Nozick
Assistant Examiner—Kathleen J. Prunner
Attorney, Agent, or Firm—Charles Lamb

[57] ABSTRACT

A wet scrubbing apparatus including a housing with a fluid flow inlet and a fluid flow outlet and a plurality of contactor beds disposed therein. Each contactor bed has an inlet and an outlet in communication with the fluid flow inlet and fluid flow outlet, respectively, of the housing and each of the contactor beds includes a damper assembly pivotally disposed within its inlet. As the gas flow rate through the apparatus changes, individual contactor beds can be removed from or brought onto stream by closing or opening selected damper assemblies.

5 Claims, 2 Drawing Figures

DAMPER ASSEMBLY FOR MOBILE BED SCRUBBER

BACKGROUND OF THE INVENTION

This invention relates to a wet scrubbing apparatus and more particularly relates to a damper assembly disposed within a wet scrubbing device for regulating the rate of flow-through gases to be scrubbed through individually and separately operative contactor beds.

With the growing concern about the quantity of sulfur oxides, particularly sulfur dioxide, being introduced into the atmosphere from industrial stack gases, emphasis has focused upon developing air pollution control systems, particularly wet scrubbing systems, that are capable of achieving a high degree of sulfur dioxide removal from such industrial stack gases. One advantageous type of system that has been proposed is a wet scrubbing system including a scrubbing tower with a packing therein composed of light weight spheres adapted to form a unitary circulating bed in which the spheres are in contact with one another yet maintain a limited freedom of movement relative to one another. The bed as a total unit is designed to circulate through the scrubbing tower. To assist this circulatory movement the spheres are guided by a slanted retaining grid or plate located in the upper region of the tower. While the circulating bed, like certain conventional packing, provides a large interfacial area of contact between the liquid descending through the interstices between the spheres and the gases ascending in countercurrent flow to the liquid, it has advantages over other more conventional systems. One such advantage is that due to the rotational and circulatory movement of the balls in the bed no channeling occurs. Solid particles carried by the liquid or gas do not settle permanently on the packing, but on the contrary may be continuously washed off. Plugging is thereby reduced and there is no need for periodic shut down to clean or replace the packing.

In this type of scrubber maintenance of the desired type of motion of the gas contact elements depends upon the fluid velocities, and particularly on the velocity of the incoming dirty gas. With very low gas velocities there is not sufficient lift for the gas contact elements to be buoyed off a bottom restraining grid and to circulate in the manner contemplated. This is particularly true where the densities of the elements are high and where the rate of liquid flow in the opposite direction to that of the gas flow is relatively high. On the other hand, when the gas velocities are too high, there is a problem of lodging some or all of the gas contact elements against the restraining grids. Specifically, the gas and liquid velocities used in a circulating scrubber of the type contemplated are generally in the range of about 500 to 1700 feet per minute and 10 to 75 U.S. gallons per minute per square foot, respectively. As a result of such high velocities, not only is throughput or capacity of the apparatus considerably increased but also absorption efficiency is markedly improved. Also, recovery of the gas constituents is improved, which may be the purpose of the operation.

SUMMARY OF THE INVENTION

In accordance with the present invention, in the fabrication of some of these wet scrubbing systems, it has been found that to obtain optimum scrubbing of industrial stack gases with the gas flow velocity therethrough being maintained at several hundred feet per minute, wet scrubbing systems can be employed which have multiple contactor beds operated in parallel and which are selectively removed or inserted into the gas flow stream as the gas flow varies. In this manner, the industrial stack gas flow rate through a given scrubber is maintained at a proper velocity.

In the present invention, it is recognized that it is desirable to provide a damper assembly for a wet scrubbing system which is inexpensive, easily constructed, and easily and quickly operable. Furthermore, it is recognized that it is desirable to provide damper assemblies for use in a wet scrubbing system which includes a plurality of contactor beds in parallel, a damper assembly being disposed within a stack gas inlet of each contactor bed. It is even further recognized that it is desirable to provide a wet scrubbing system including a plurality of contactor beds in parallel wherein individual beds may be removed from the line without effecting the efficiency of the operation of the scrubbing system.

The present invention advantageously provides a straightforward arrangement for damper assemblies which may be used in a wet scrubbing system. The present invention further provides a damper assembly which may be utilized in the stack gas inlet of a contactor bed which is in parallel with a plurality of similar contactor beds in a wet scrubbing system. The present invention even further provides a wet scrubbing system including a plurality of contactor beds wherein individual beds may be shut down upon reduction of gas flow in the system thereby preventing a decrease in efficiency of the scrubbing system. In addition, the present invention recognizes and provides a novel arrangement to adjust for scrubbing solution carry over in individually shut-down units. It is to be understood that the present invention is not to be considered as limited to scrubbers of the circulating bed type but can be utilized with other scrubbers known in the art including floating bed and packed bed type scrubbers.

Various other features of the present invention become obvious to those skilled in the art upon reading the disclosure set forth hereinafter.

More particularly, the present invention provides a method for removing sulfur dioxide from a waste gas stream from a waste gas stream source including the steps of: passing the waste gas stream in divided section through a plurality of individually separate contactor bed zones; introducing scrubbing solution in counterflow in each of the contactor bed zones; and, adjusting the flow of the gas stream through a preselected number of the plurality of zones in accordance with the flow rate from the waste gas stream source. Even more particularly, the present invention provides a wet scrubbing apparatus comprising: a housing with a fluid flow inlet and a fluid flow outlet; a plurality of contactor beds disposed within the housing, each bed including a fluid flow inlet and a fluid flow outlet, the contactor bed fluid flow inlet being in fluid communication with the housing inlet; the contactor fluid flow outlet being in fluid communication with the housing outlet; and, a damper assembly pivotally disposed within the contactor bed fluid flow inlet wherein individual contactor beds in a wet scrubbing apparatus may be closed off to waste gas flow.

It is to be understood that the description of the examples of the present invention given hereinafter are not by way of limitation and various modifications within the scope of the present invention will occur to those skilled in the art upon reading the disclosure set forth hereinafter.

Figure 2:
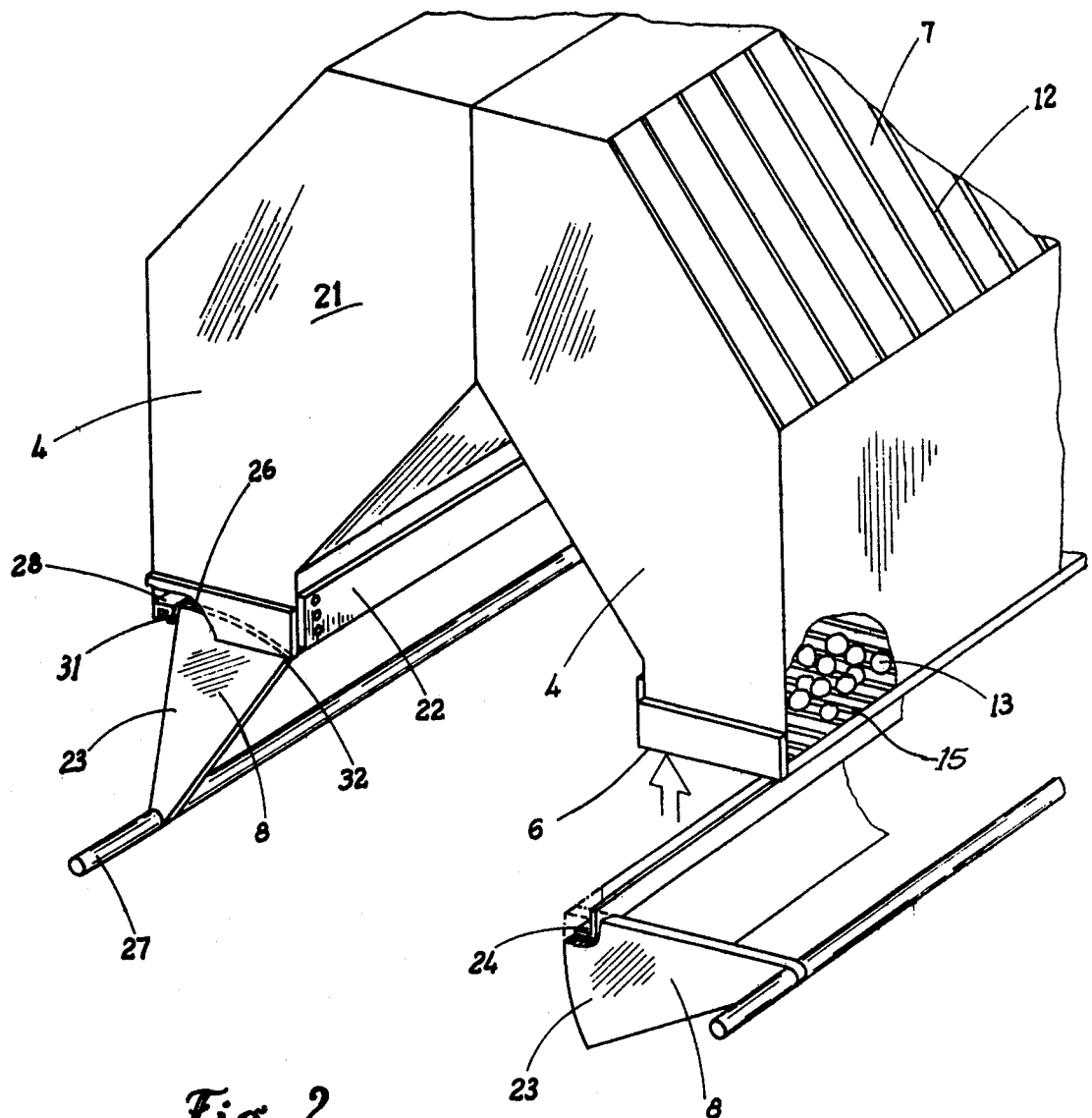

Referring to the drawings:

FIG. 1 is a perspective view, partially cut away, of a wet scrubbing unit of the present invention; and, FIG. 2 is an enlarged perspective view, partially cut away, of two contactor beds of the present invention.

FIG. 1 of the drawings illustrates one preferred structure of a wet scrubbing apparatus of the present invention. The wet scrubbing apparatus of the present invention includes a housing 1 having a dirty or waste gas inlet 2 and a clean gas outlet 3. Disposed within the housing 1 is a plurality of contactor beds 4 which include fluid flow inlets 6 and fluid flow outlets 7, fluid flow inlet 6 being in fluid communication with the dirty gas inlet 2 and the fluid flow outlet 7 being in fluid communication with the clean gas outlet 3. Disposed adjacent to the fluid flow inlet 6 of each contactor bed is a damper assembly 8, damper assembly 8 being pivotally attached to provide a fully open and a fully closed position for regulating dirty gas flow into the contactor bed 4. Disposed above and adjacent to the gas outlet 7 is a spray header 9 for the introduction of a scrubbing liquid to each contactor bed 4. Contactor bed 4 is further provided with a grid means 12 coextensive with the clean gas outlet 7 to prevent escape of contact elements 13 (FIG. 2) therefrom which are generally disposed within the contactor bed 4 to achieve good contact between the dirty gas which is to be cleaned and the scrubbing solution which is sprayed into the contactor bed 4 through a plurality of spraying conduits 11.

Dirty gas which is to be scrubbed is introduced into the lower portion of the housing 1 through the inlet 2 which is disposed through the wall of the housing 1. Simultaneously therewith a scrubbing solution, usually a solution containing a sulfur dioxide reactant of suitable activity, is introduced to the contactor beds 4 through individual spray headers 9 and preferably through suitable spraying conduits 11 so that a multiplicity of streams are descending on or are projected downwardly toward the grid 12 and the contact elements 13 in the contactor bed 4 thereby assuring uniform distribution of the liquid substantially over the entire surface of the bed, the contact elements 13 being maintained in the scrubbing zone by grid 12 at the top in cooperation with an opposed grid 15 at the bottom. The scrubbing solution is withdrawn from the contactor bed 4 through the dirty gas inlet 6 and is collected in the bottom of the housing 1 and recycled (not shown) or pumped to other locations for treating and removing the sulfur dioxide which had been previously removed from the dirty gas stream. In a preferred scrubbing device, such as the one disclosed in U.S. Pat. No. 3,810,348, wherein the contact elements circulate around a baffle member, the present damper assembly has been found to be a preferred means for regulating the flow of dirty gases into the scrubber. However, it has been found to be useful in floating bed scrubbers as well.

In FIG. 2, two contactor beds 4 are shown. Contactor bed 4 is provided with a housing 21, a damper assembly 8 and an adjustable weir plate 22 (described more fully hereinafter). The damper assembly 8 includes two mounting plates 23, only one being shown, attached to opposite ends of a longitudinally extending rod member 27. Plates 23 are provided with an arcuate mounting section opposed to the attachment to the rod member 27, the arcuate mounting section having a radius of curvature substantially the same as the radius of curvature of a damper plate 26. The damper plate 26 is transversely attached to each mounting plate 23 and extends substantially the entire length of the inlet 6 and is of sufficient width to completely close off the inlet 6 when properly positioned. Further, a support member 24 is also provided to run the entire length of the plate 26 to reinforce and prevent sagging of the plate 26. Mounting plates 23 being attached to rod member 27 pivots around the axis of the rod member 27 upon rotating movement thereof thereby adjusting the position of the damper plate 26 in relation to the inlet 6. As exemplified, the damper assembly 8 has an opening therein between the damper plate 26 and the rod member 27 so that in an open position, waste gas flows through the opening into contactor bed 4 without restriction of the flow. A stop means is provided along one side of the inlet 6 for limitation of movement of the damper assembly 8 in a closed position, the stop means being disposed to receive the leading edge 31 of the damper plate 26. In the illustrated embodiment, the stop means is a longitudinally extending channel member 28. Disposed along the side of the inlet 6 opposite stop member 28 is a vertically extending adjustable weir plate 22. The lower terminal edge of the weir plate 22 in its downward extreme position abuts the trailing edge of plate 26 in a substantially fluid tight relationship when the damper assembly 8 is in a closed position. Adjustable weir plate 22 is adaptable for movement in a vertical plane at selected positions above the damper assembly 8 thereby permitting a selected spacing between the damper 8 and the lower terminal edge of the weir plate 22. The adjustable weir plate 22 is utilized only when the damper assembly 8 is in a closed position and has a two-fold purpose. Firstly, in the addition of scrubbing solution to the selected contactor bed in a scrubbing device, as illustrated, a small quantity of solution will be, inadvertently, sprayed into the beds which are closed off to gas flow. In this instance, it is necessary to remove this solution from the bed which is not in use and this is accomplished by raising the weir plate 22 a selected distance above the damper assembly 8 thereby creating an opening to allow the solution to flow from the bed by way of said opening. Secondly, a small quantity of scrubbing solution in the bottom of the bed is desirable when the bed is closed to gas flow as this solution seals off the inlet in case of leakage of gas around the damper assembly when such flow is undesirable.

In the operation of the exemplified wet scrubber apparatus of the present invention, the dirty gas introduced into the lower portion of the housing 1 through the inlet 2 is divided into a plurality of streams, each stream passing into selected contactor beds 4 through the selected damper assemblies 8 which are in an open position. Individual spray headers 9 are opened to introduce scrubbing solution into the selected contactor beds 4. Since this efficient operation of the apparatus is dependent upon the efficient operation of the individual contactor beds 4, this being the proper flow rate through the beds 4 in order to maintain the packing, exemplified as spheres 13, in a predetermined circulating arrangement, only the number of beds 4 that are needed to maintain such circulatory arrangement are open for flow therethrough. Thus, as the overall flow rate through the apparatus changes, individual contactor beds 4 are removed from or brought onto stream by fully closing or fully opening selected damper assemblies 8.

It will be realized that various changes may be made to the specific embodiment shown and described without departing from the principles of the present invention.

What is claimed is:

1. A wet scrubbing apparatus comprising: a housing with a fluid flow inlet and a fluid flow outlet; a plurality of contactor beds disposed within said housing, each bed including a fluid flow inlet and a fluid flow outlet, each said contactor bed fluid flow inlet being in fluid communication with said housing inlet; a spray means positioned to introduce scrubber solution into said contactor beds; each said contactor bed fluid flow outlet being in fluid communication with said housing outlet; a damper assembly pivotally disposed in each said contactor bed fluid flow inlet to control said contactor bed inlet fluid flow wherein individual contactor beds may be closed off to waste gas flow; each said contactor bed inlet includes an adjustable weir plate, said adjustable weir plate extending downwardly from the side of said inlet opposite a stop means, said weir plate in its downward extreme position abutting a trailing edge of said damper assembly in its normally closed position.

2. The wet scrubbing apparatus of claim 1 wherein each said damper assembly includes two mounting plates attached to opposite ends of a longitudinally extending rod member, said plates having an arcuate mounting section opposed to said attachment to said rod member, said arcuate mounting section having a radius of curvature substantially the same as a damper plate mounted thereto, said damper plate extending substantially the entire length of said contactor bed inlet, said damper plate being of sufficient width to close off said inlet when in a closed position.

3. The wet scrubbing apparatus of claim 1 wherein each said contactor bed fluid flow inlet is of substantially rectangular cross-section including a stop means disposed along one side thereof, said stop means being disposed to receive a leading edge of said damper assembly.

4. The wet scrubbing apparatus of claim 1, each said contactor bed including a grid means therein supporting contact elements thereon, said grid means being disposed between the contacting bed fluid flow inlet and said contacting bed fluid flow outlet.

5. The wet scrubbing apparatus of claim 4 wherein each said contactor bed fluid flow inlet is also a solution discharge outlet.

* * * * *